United States Patent Office 3,308,206
Patented Mar. 7, 1967

3,308,206
CATIONIC-DYEABLE AMINE-ALDEHYDE MODIFIED POLYPROPYLENE
Frederick Fordemwalt, Middlesex, N.J., assignor to American Cyanamid Company, Stamford, Conn., a corporation of Maine
No Drawing. Filed Oct. 31, 1963, Ser. No. 320,519
11 Claims. (Cl. 260—854)

This invention relates to a process for modifying polypropylene thermoplasts in the molten state; to the resultant modified products; and to the dyeing of products so produced. Further, it also contemplates novel modifying agents for the purpose and the use of such agents. Still further, it is also concerned with a process for improving the dyeability of such thermoplasts and the dyeing of modified thermoplasts using available cationic dyes.

As contemplated in the present invention, polypropylene thermoplasts comprise long-chain paraffinic polymers consisting of recurring propylene groups as "building blocks." The propylene group has the structure

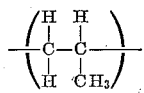

which is obviously unsymmetrical, however, they are so arranged that each has the same relation in space, i.e., an "isotactic" configuration. The apparent molecular weight as determined by viscosity (Mv) may range from about 30,000 to as high as 300,000. In general, the density at room temperature will average about 0.9.

For definitive purposes, several of the foregoing terms are used herein as having the following meanings:

The term "polymeric aminoplasts" is used to designate the water-insoluble polymers derived from (a) melamine and an aldehyde; (b) urea and an aldehyde; and (c) the alkyl derivatives of (a) or (b). These will be discussed more fully below.

The term "cationic dyes" is used to designate those dyes in which the colored portion of the dye molecule is either positively charged, i.e., a cation; or is capable of protonation. These dyes also will be discussed more fully below.

Fibrous materials prepared from polypropylene thermoplasts have many excellent physical characteristics. They may be drawn into very fine filaments of the order of about 1.5 denier. Their great strength, good abrasion resistance, low specific gravity, and low static susceptibility make them easy to spin and weave. Their freedom from pilling and low moisture absorption enhance their use in production of "drip-dry" or "wash-and-wear" fabrics.

Unfortunately, because of the low moisture absorption characteristic, dyeing of polypropylene has presented an exceedingly difficult problem. Dyeings suffered from one or more of such defects as weak shades; surface-coatings of dye which crock badly; colors which bleed in laundering; partially-penetrated color which is removed in drycleaning; and shades which have poor fastness-to-light. Even when using the best previous known methods in conventional dyeing operations; satisfactory medium-to-heavy shades were not obtainable.

If cationic dyes could be used many of these difficulties would be overcome. To this end, procedures have been proposed for modifying the surfaces of formed structures of polypropylene to make them receptive to cationic dyes. While such procedures may be adapted to treatment of filaments and fibers, they are not solutions to the problem solved by the present invention. The latter is concerned with modifying a polypropylene thermoplast, in liquid or molten state, so that after fibrous material has been formed therefrom, it will be receptive to dyeing with cationic dyes.

A different approach is shown for example in U.S. Patent 3,013,998. Therein, dyeability of some polymers of α-olefins has been modified to enable dyeing by improved absorption of acid dyes and disperse acetate dyes. This is accomplished by incorporating, prior to curing, some five to fifteen percent by weight based on the polypropylene of an uncured epoxy resin. Again, however, this procedure is not a solution to the present problem. Acid dyes are anionic, i.e., the color is in the *negatively-charged* portion of the molecule. Disperse acetate dyes do not carry any electrical charge.

Therefore, prior to tthe present invention, there still remained a need for a process for modifying polypropylene thermoplasts, in the liquid or molten state, to enable resultant formed structures to be successfully dyed, using commercially-available cationic dyes in conventional dyeing processes. Such a process should be simple and easily carried out. It should be economically adaptable to dyeing not only fibrous material including tow, filaments, yarns, woven or nonwoven fabrics, webbing and the like, but also sheets, films and the like. Finally, it should not result in physical damage to the polypropylene thermoplast structures. It is, therefore, the object of this invention to provide such a procedure.

In general, the overall dyeing process of the present invention may be simply described. A polypropylene thermoplast, in the molten form, is modified by the following stepwise procedure.

(1) Incorporating therein about 0.5 to about 25.0 weight percent on the weight of the polypropylene (OWP) of a water-insoluble polymeric aminoplast having a maximum particle size not greater than about two microns.

(2) Admixing the polymeric aminoplast with the molten polypropylene thermoplast, as by stirring or other suitable mixing device, until a homogeneous suspension of discrete particles of the polymeric aminoplast in the molten thermoplast is obtained. While no definite time limit can be established due to the difference in various types of mixing equipment, in usual practice this step will be carried out in some ten to thirty minutes.

(3) Converting the so-treated thermoplast into formed structures, i.e., fibers, filaments, sheets, films and the like.

(4) Coloring the formed modified material with cationic dyes, employing conventional dyeing processes.

It is an advantage of the present invention that the modified thermoplast in the form of filaments, fibers or yarns may be combined or woven with other natural or synthetic products which have an affinity for basic dyes to produce mixed fabrics having solid shades. A further advantage is that if so desired the same fibrous material similarly combined or woven with different natural or synthetic fibrous products having no affinity for cationic dyes may be used to produce contrasting effects.

As so described, modifications of the polypropylene by the process of the present invention appears deceptively simple. The steps of the preparation of the water-insoluble aminoplasts and their subsequent admixture into the thermoplasts are important. Each involves certain criteria which, within certain ranges, must be observed. Therefore, each will be discussed more fully in relation to the problem solved thereby as well as its place in the overall treatment.

It is not certain what specific modification of the polypropylene occurs in the treatment of this invention, nor how it occurs. However, it does occur and a completely different "modified" formed structure results therefrom. This is clearly shown by the change in dyeability. As noted above, unmodified polypropylene thermoplasts have little affinity for any dyes. It is not possible to obtain medium-to-heavy shades thereon with cationic dyes.

Polymeric aminoplasts per se are dyeable with "anionic" dyes. When applied to cellulosic fibers in preparing "wash-and-wear" products, they are said to "animalize" the cellulosic material in that the resultant fibers have affinity for wool dyes. It is, therefore, completely unexpected that introduction into the polypropylene thermoplast of a water-insoluble aminoplast polymer, dyeable with anionic dyes, does impart to the polypropylene thermoplast an affinity for cationic dyes.

Accordingly, from the foregoing discussion, it is believed to be apparent that a principal feature of the present invention is formation of a homogeneous suspension of discrete particles of a water-insoluble aminoplast in a molten polypropylene thermoplast and subsequent formation of formed structures from the resultant molten mass.

THE POLYPROPYLENE THERMOPLAST

Different types of polypropylene may be employed in the process of this invention. One is designated herein, as in the trade, as "virgin" polypropylene. This designation relates to long-chain paraffinic polymers which have not previously been formed into product structures. Another is designated herein, again as in the trade, as "reworked" polypropylene. This term relates to a product which has been previously formed into product structures, as by spinning, molding, and the like. It is also within the scope of the invention to employ mixtures of the two types.

PREPARATION OF AMINOPLASTS

As noted above, several types of polymeric aminoplasts are contemplated: (a) condensation products of melamine with an aldehyde; (b) condensation products of a urea (including thiourea) with an aldehyde; and (c) alkyl derivatives of both. Regardless of the aminoplast type employed, a critical factor is that the polymer be insoluble in aqueous media.

Such insoluble aminoplasts are commercially-available either as water-insoluble polymers or as water-soluble precursors, only partially polymerized to form dimers or trimers, which may then be readily further polymerized to the insoluble form. In general, the latter type is preferred. It permits the user to control the size and uniformity of the discrete, insoluble aminoplast particles. Accordingly, it is discussed herein as illustrative. Both types are commercially available under various designations, such materials being well known for other uses. A number are shown in U.S. Patent 2,715,619.

As noted above, the largest dimension of the discrete particles of the water-insoluble polymeric aminoplasts should be not in excess of about two microns. A more preferable size range is from about 0.02 to about 0.2 micron. Preparation of discrete particles within this size range involves several critical features.

One such critical feature relates to the concentration of aminoplast precursor in the aqueous solution. Concentrations may range from about three to about fifteen weight percent on the weight of the solution (OWS). Use of about five to ten weight percent is a good practice. The temperature of the solution should be maintained at from about 200° to about 250° F., a "low boil" being satisfactory and easily maintained by visual observation.

A second feature is the type of polymerization catalyst employed. Best results are obtained using a highly-ionizable mineral acid, such as hydrochloric acid. Other similarly highly-ionizable acids may be used. In general, amounts of acid equivalent to the use of from about 0.3 to about 15 weight percent (on the dry weight of the aminoplast) of concentrated (38%) hydrochloric acid will be found desirable. Use of some 0.6 to 12 weight percent of this commerical concentrated hydrochloric acid will constitute a good practice.

A third feature relates to the concentration of the hydrochloric acid catalyst at the time of its addition to the aqueous solution of partially polymerized aminoplast. Dilution of the concentrated (38%) acid with some one to four parts by weight water slows down the rate of polymerization and enhances formation of discrete particles in the desired size range. The diluted acid catalyst should be added very slowly to the aminoplast solution, the solution being vigorously stirred, preferably with a high-speed stirrer. When all the diluted acid catalyst has been added, stirring and heating at a low boil is continued for some twenty to forty minutes.

Polymerized aminoplast solids then are separated from the aqueous medium by any available conventional method. Thereafter, such solids are reduced to discrete particles by milling, salt grinding, or other conventional processes apparent to the skilled artisan. Use of a vacuum dough mixer for removing the last portion of the aqueous medium usually reduces any "flocs" to the ultimate particle and produces excellent modifying aminoplasts, having the desired maximum particle size.

MODIFYING THE POLYPROPYLENE THERMOPLAST

Polypropylene in one of the forms noted above is entered into a kettle equipped with external heating units, and heated to about 600° F. Resultant molten polypropylene is then ready to receive the modifying aminoplast which is added gradually, and slowly, with stirring. Stirring and mixing are continued until a uniform, homogeneous dispersion of the aminoplast throughout the thermoplast is complete. With suitable mixing equipment, this usually requires about ten to about thirty minutes after the final addition of the aminoplast. Satisfactory, uniform dispersion of the aminoplast throughout the thermoplast may be readily determined as for example by inserting a glass rod into the molten mass, then withdrawing it. Molten polypropylene thermoplast adheres to the rod and may be drawn into a fine filament which becomes rigid upon cooling. This filament may then be examined by microscopic methods, Tyndal beam, or other methods of evaluation available for the determination of suspensions of solids in solids.

As noted above, the amount of the modifying aminoplast may range from about 0.5 to about 25.0 weight percent on the weight of the polypropylene. Aminoplasts having discrete (or ultimate) particles ranging from about 0.02 to about 0.2 micron cause exellent results to be obtained when about 0.6 to about 10.0 weight percent on the weight of the molten polypropylene is used. Attainment of aminoplasts having ultimate particles in this size range is a critical feature of the present invention.

FORMING THE PRODUCT STRUCTURE

When test filaments of the polypropylene indicate that the aminoplast is uniformly suspended throughout the polypropylene, modification is considered complete. Resultant modified material may be formed into product structures such as filaments, sheets, tow, molded objects and the like. This is carried out using methods and equipment conventional for the purpose. The specific method used forms no part of this invention. So-modified polypropylene thermoplast may then be colored with a cationic dye. Since the "structures" dyed usually are in the form of filaments or fibers, the designation "fibers" will be used in describing the dyeing methods.

DYEING MODIFIED POLYPROPYLENE FIBERS

Modification of the polypropylene causes it to be receptive to cationic dyes when such dyes are applied by conventional dyeing methods. Resultant dyed products are well penetrated by the dye and are resistant to bleeding, crocking and dry cleaning; they have bright hues and can be obtained in medium-to-heavy (strong) shades. As noted above, the colored portion of the dye molecule either carries a positive charge, or is capable of receiving a positive charge, i.e., capable of protonation.

Examples of cationic or quaternized dyes which carry a positive charge are the basic dyes, including the more-recently developed cationic dyes. Typical groups from which these dyes are derived are the diphenyl methanes, triphenyl methanes; diphenyl trinaphthyl methanes, pyronines, diazines, oxazines, thiazines, etc. Typical examples of these general classes are shown in the Color Index as Basic Blue 1, 6, 9, 14 and 26; Basic Orange 1 and 2; Basic Green 1, 4 and 5; Basic Brown 1; Basic Red 2 and 9; Basic Violet 1, 2, 10 and 14; Basic Yellow 2. Other useful cationic dyes are shown for example in U.S. Patents 2,864,813; 2,883,373; 2,889,315 and 2,893,816.

Examples of unquaternized dyes capable of protonation are the free bases of the dyes represented by the cationic dyes listed above. On reaction with an acid these free bases are capable of protonation. Sulfamic acid is especially useful for this purpose. It can be blended with the dye or added to the dye bath. Other acids, such as acetic, formic and sulphuric are useful but, because they are liquid, are not blended with the dye base but are added to the dye bath. The cationic, or quaternized, types and the basic dyes in the form of their inorganic salts are directly soluble in the dye bath. The other dyes form soluble, positively-charged dyes in the acidic dye bath.

All the dyes described above are included in the definition of "cationic" dyes as used herein. However, they do not give full, strong shades on polypropylene until the polymer is modified. Thereafter, they may be applied by any conventional method desired, the details of the dyeing forming no part of the invention. Several methods are described below. These include use of weakly-acid dye baths and/or the presence of salt or other assistants normally used in dyeing. Dyed modified polypropylene material has a strong color, the dye being well penetrated as is readily evident when a cross-section of the dyed fiber is examined microscopically. The dyed material does not suffer from excessive crocking and does not bleed or wash out, either with water or by dry cleaning, and has a fastness-to-light superior to the lightly tinted fibers obtained in attempted dyeing of unmodified polypropylene.

The invention will be more fully described in conjunction with the following examples which are intended as illustrative. Unless otherwise stated, all parts and percentages are by weight. Concentration percentages of the ingredients in the modifying step are based on the weight of the polypropylene (OWP). When percentages are based on the weight of the solution, they are indicated as (OWS). All temperatures are indicated in degree Fahrenheit.

In the first example, an illustrative method for the preparation of the particulate aminoplast is described.

*Example 1*

A water-insoluble polymeric aminoplast is prepared by diluting 100 parts of a commercially-available methylated methylol melamine with 100 parts water, then adding another 1500 parts water to form an approximately six weight percent solution. The solution is then heated to the boil and 10 parts commercial concentrated (38%) aqueous hydrochloric acid diluted with 10 parts water is gradually added with stirring. A water-insoluble polymer precipitates and is collected, dried and finely ground.

*Example 2*

Portions of particulate aminoplast, prepared in Example 1, are used to modify portions of a molten polypropylene thermoplast consisting of "reworked" fibers. The mass is maintained as a melt by heating, the aminoplast being added thereto with agitation. Heating and stirring is continued until the mixture becomes uniform. The resultant uniform melt is then formed into filaments by extrusion in a conventional press and the filaments are hardened and formed into five gram skeins. Three samples are formed having the following proportions.

PARTS BY WEIGHT, THERMOPLAST AMINOPLAST

| | | |
|---|---|---|
| Sample A | 500 |  |
| Sample B | 500 | 100 |
| Sample C | 500 | 25 |

*Example 3*

A number of test separate dye baths are prepared, each containing 2 ml. of a 5% solution of 28% acetic acid in 200 ml. of water in which is dissolved 25 mg. of C.I. Basic Blue 1 (C.I. 42025). Into each dye bath is entered one of the skeins produced in Example 2. Each of the dye baths is held at the boil for one-half hour, the skeins being regularly turned, after which the skeins are removed, washed with water and dried.

Each of the skeins of Samples B and C is dyed a full greenish-blue shade while the unmodified polypropylene fibers of Sample A are only weakly tinted. Dyeings made on Samples B and C do not bleed or crock.

*Example 4*

The procedure of Example 3 is repeated except that the dye C.I. Basic Blue 1 is replaced by one of a number of commercially-obtained cationic dyes. In each instance, Sample A skeins are only weakly tinted and skeins of Samples B and C are dyed a full shade. Illustrative dyes and the shades obtained are summarized in the following table.

| Dye | Generic Class | C.I. Number | Shade |
|---|---|---|---|
| Basic Blue 26 | Diphenylnaphthylmethane | 44045 | Blue. |
| Auramine G | Diphenylmethane | 41005 | Greenish-yellow. |
| Safranine T | Diazine | 50240 | Pink. |
| Rhodamine Scarlet G. | Pyronine | 45015 | Red. |
| Methyl Violet | Triphenylmethane | 42535 | Violet. |
| Rhodamine B | Rhodamine | 45170 | Bluish-red. |

*Example 5*

The procedure of Example 1 is repeated to prepare a water-insoluble particulate polymeric aminoplast, substituting an urea-formaldehyde resin consisting of two parts methylol urea and one part dimethylol urea for the methylated methylol melamine. Resultant ground aminoplast is used in the 5:1 ratio of Sample B to modify a polypropylene melt in the procedure of Example 2 to obtain Sample D. Skeins of unmodified Sample A and of Sample D are dyed according to the procedure of Example 3. A full greenish-blue shade is obtained on Sample D, Sample A again being only lightly tinted.

I claim:

1. In modifying an isotactic polypropylene thermoplast having an apparent molecular weight of from about 30,000 to about 300,000 to form a material dyeable with a cationic dye; the improved process which comprises:

heating said polypropylene to a temperature sufficiently high to form a liquid melt;

while maintaining said melt in the liquid state, adding thereto from about 0.5 to about 25 weight percent of a water-insoluble polymeric aminoplast selected from the group consisting of (a) a condensation product of melamine with an aldehyde, (b) a condensation product of urea or thiourea with an aldehyde and (c) alkyl derivatives of (a) or (b); said polymeric aminoplast being in particulate form the maximum particle dimension not exceeding about two microns;

agitating the resultant mixture until dispersion of said aminoplast in said thermoplast becomes substantially uniform;

then forming the so-treated material into a formed solid structure to be dyed.

2. A procedure according to claim 1 in which said water-insoluble, polymeric aminoplast is a condensation product of melamine and formaldehyde.

3. A procedure according to claim 1 in which said water-insoluble, polymeric aminoplast is a condensation product of urea and formaldehyde.

4. A procedure according to claim 1 in which said water-insoluble, polymeric aminoplast is a lower-alkyl alkylated condensation product of melamine and formaldehyde.

5. A procedure according to claim 1 in which said water-insoluble, polymeric aminoplast is a lower-alkyl alkylated condensation product of urea and formaldehyde.

6. A procedure according to claim 1 in which the particle size of the said polymeric aminoplast has a maximum dimension of from about 0.02 to about 0.2 micron.

7. A composition of matter capable of combining with cationic dyes, said composition being the product derived by admixing from about 0.5 to about 25 percent by weight of a water-insoluble polymeric aminoplast selected from the group consisting of (a) a condensation product of melamine with an aldehyde, (b) a condensation product of urea or thiourea with an aldehyde and (c) alkyl derivatives of (a) or (b), said aminoplast being in particulate form and having a maximum particle size not exceeding about two microns, with a molten isotatic polypropylene thermoplast having an apparent molecular weight of from 30,000 to about 300,000; forming a uniform admixture thereof, and thereafter forming said uniform admixture into a shaped structure.

8. The product of claim 7 in which the polymeric aminoplast is a condensation product of melamine and an aldehyde.

9. The product of claim 7 in which the polymeric aminoplast is a condensation product of urea and an aldehyde.

10. The product of claim 7 in which the formed structure is a filament.

11. The product of claim 7 colored with a cationic dye.

References Cited by the Examiner

UNITED STATES PATENTS

| 2,782,178 | 2/1957 | Duffee et al. | 260—854 |
| 3,137,989 | 6/1964 | Fior et al. | 260—854 |

FOREIGN PATENTS

| 894,178 | 4/1962 | Great Britain. |

MURRAY TILLMAN, Primary Examiner.

J. C. BLEUTGE, Assistant Examiner.